United States Patent
Schlanger et al.

(10) Patent No.: US 10,216,515 B2
(45) Date of Patent: Feb. 26, 2019

(54) PROCESSOR LOAD USING A BIT VECTOR TO CALCULATE EFFECTIVE ADDRESS

(71) Applicant: Oracle International Corporation, Redwood City, CA (US)

(72) Inventors: Erik Schlanger, Austin, TX (US); Charles Roth, Austin, TX (US); Daniel Fowler, Georgetown, TX (US)

(73) Assignee: Oracle International Corporation, Redwood Shores, CA (US)

( * ) Notice: Subject to any disclaimer, the term of this patent is extended or adjusted under 35 U.S.C. 154(b) by 130 days.

(21) Appl. No.: 15/296,886

(22) Filed: Oct. 18, 2016

(65) Prior Publication Data

US 2018/0107482 A1 Apr. 19, 2018

(51) Int. Cl.
*G06F 9/30* (2018.01)
*G06F 9/345* (2018.01)

(52) U.S. Cl.
CPC ............ *G06F 9/30021* (2013.01); *G06F 9/30* (2013.01); *G06F 9/30018* (2013.01); *G06F 9/30036* (2013.01); *G06F 9/30043* (2013.01); *G06F 9/345* (2013.01)

(58) Field of Classification Search
None
See application file for complete search history.

(56) References Cited

U.S. PATENT DOCUMENTS

| | | | |
|---|---|---|---|
| 5,649,181 A | 7/1997 | French | |
| 5,961,628 A | 10/1999 | Nguyen | |
| 6,499,033 B1 | 12/2002 | Vagnozzi | |
| 7,100,019 B2 | 8/2006 | Norris | |
| 7,197,521 B2 | 3/2007 | Subramoney | |
| 2006/0075208 A1* | 4/2006 | Jones | G06F 9/3001 711/217 |
| 2012/0246449 A1 | 9/2012 | Assarpour | |
| 2016/0124651 A1* | 5/2016 | Sankaranarayanan | G06F 9/30036 711/130 |
| 2017/0177357 A1* | 6/2017 | Ould-Ahmed-Vall | G06F 9/30036 |

OTHER PUBLICATIONS

Cray; "Vector Processors"; Revised by Krste Asanoviv; Public lecture at Lawrence Livermore Laboratories on the Introduction of the Cray-1 (1976); 2003 Elsevier Science (USA).
Rahman; Intel Xeon Phi Coprocessor Vector Microarchitecture; Intel Corporation; May 31, 2013.

* cited by examiner

*Primary Examiner* — Corey S Faherty
(74) *Attorney, Agent, or Firm* — Meyertons, Hood, Kivlin, Kowert & Goetzel, P.C.

(57) ABSTRACT

Circuitry may be configured to identify a particular element position of a bit vector stored in a register, where a value of the element occupying the particular element position matches a first predetermined value, and determine an address value dependent upon the particular element position of the bit vector and a base address. The circuitry may be further configured to load data from a memory dependent upon the address value.

14 Claims, 7 Drawing Sheets

PROCESSOR LOAD USING A BIT VECTOR TO CALCULATE EFFECTIVE ADDRESS

BACKGROUND

Technical Field

Embodiments described herein relate to integrated circuits, and more particularly, to techniques for operating on data in memory.

Description of the Related Art

Modern computing systems may include multiple processors or processor cores configured to execute software programs or applications. The programs and applications may allow the processors or processor cores to perform a variety of tasks. For example, when executing a web browser program, a processor may perform operations such as requesting data from a server via a network connect, and displaying the request data to a screen or other suitable display device.

Software programs or applications may include multiple program instructions to be executed by the processors or processor cores of the computing system. The program instructions may be stored in one of various locations within a computing system, such as, e.g., main memory, a hard drive, a CD-ROM, and the like, and may be retrieved or fetched from the storage location prior to execution.

In addition to retrieving program instructions from a storage location, the processors or processor cores of the computing system may also access data stored in memory as part of the execution of a particular program or application. A portion of data may be retrieved from memory. The retrieved data may be used as part of a calculation, such as an operand of arithmetic operation. Alternatively, the data may be modified in some fashion and rewritten back to memory.

SUMMARY OF THE EMBODIMENTS

Various embodiments of a bit vector based address generator are disclosed. Broadly speaking, a circuit and a method are contemplated in which a register may be configured to store a bit vector, where the bit vector includes a plurality of elements that occupy N ordered element positions, N being a positive integer. Circuitry may be configured to identify a particular element position of the bit vector, wherein a value of the element occupying the particular element position matches a first predetermined value, and determine an address value dependent upon the particular element position of the first bit vector and a base address.

In another non-limiting embodiment, the circuitry may be further configured to load data from a memory dependent upon the address value.

In one embodiment, the circuitry may be further configured to compare the data to a second predetermined value, and store a value in another element position in the bit vector dependent upon results of comparing the data to the second predetermined value.

In a further embodiment, in order to compare the data to the second predetermined value, the circuitry may be further configured to determine which of the data or the second predetermined value is greater.

BRIEF DESCRIPTION OF THE DRAWINGS

The following detailed description makes reference to the accompanying drawings, which are now briefly described.

Figure 1:
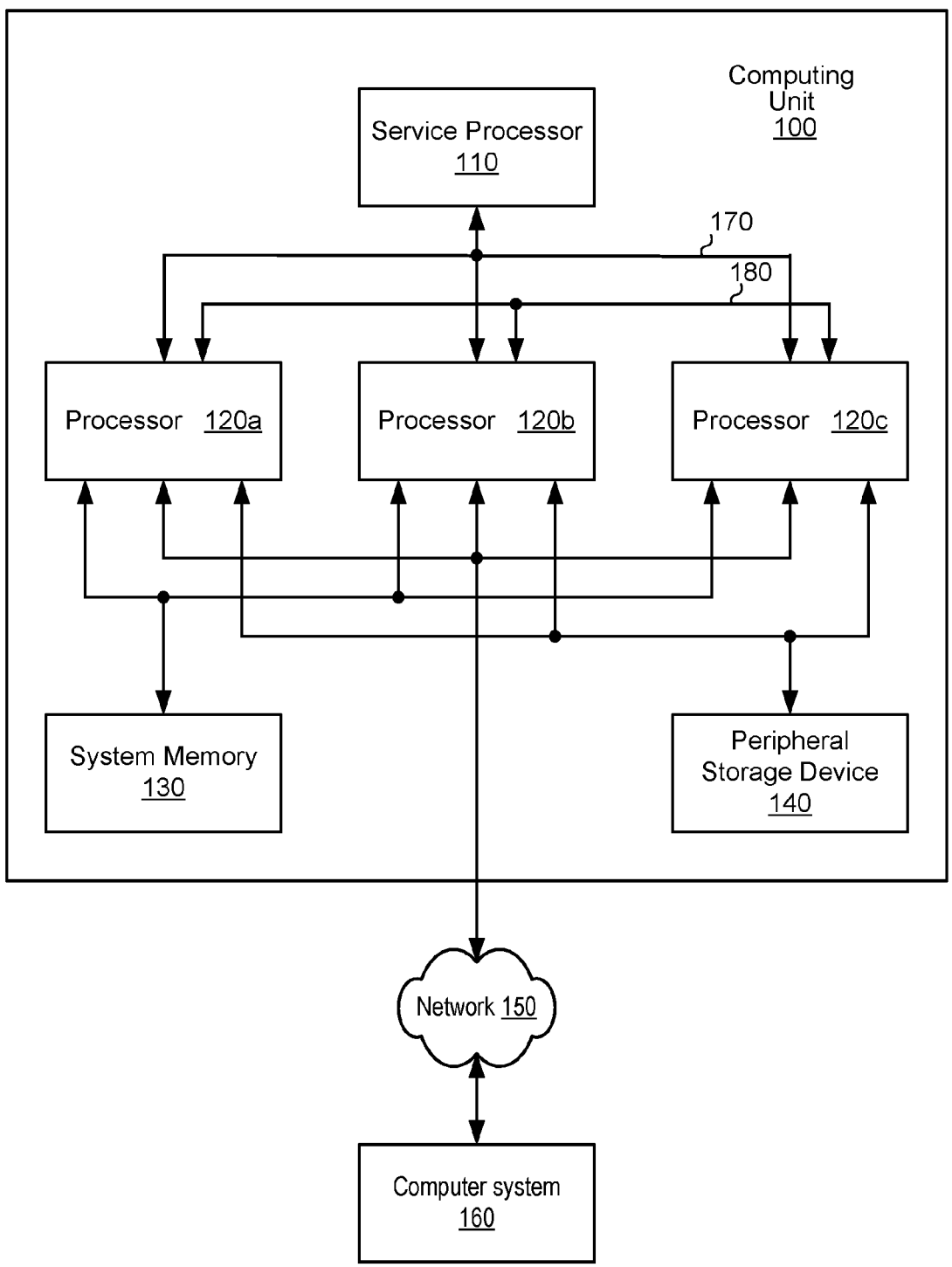
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

During execution of a program or application on a computing system, data may be read from or stored in memory included in the computing system. In some cases, the data may be formatted as vectors or arrays, which include multiple data elements, such as, a byte of data, a word of data, a half word or data, and the like. The data elements included in such vectors or arrays may be accessed in a sequential fashion. In some cases, however, not all of the data elements may actually contain values of interest. Vectors or arrays that include data elements, which may be ignored, may be referred to as sparse vectors or arrays.

To access the data elements in a vector or array, the execution of multiple program instructions, i.e., software, may be used to calculate the address of each data elements using a base address and an address offset between the storage location of each data elements. The number of program instructions necessary to perform a single such calculation may take multiple processor cycles to complete, consuming computing resources and dissipating power. The embodiments illustrated in the drawings and described below may provide techniques for calculating the address of a data element included in a vector or array while reducing a number of program instructions executed, as well as reducing power consumption.

A block diagram illustrating one embodiment of a computing system that includes a computing unit is shown in FIG. 1. In the illustrated embodiment, computing unit 100 includes a service processor 110, coupled to a plurality of processors 120a-c through bus 170. It is noted that in some embodiments, system processor 110 may additionally be coupled to system memory 130 through bus 170. Processors 120a-c are, in turn, coupled to system memory 130, and peripheral storage device 140. Processors 120a-c are further coupled to each other through bus 180 (also referred to herein as "coherent interconnect 180"). Computing unit 100 is coupled to a network 150, which is, in turn coupled to a computer system 160. In various embodiments, computing unit 100 may be configured as a rack-mountable server system, a standalone system, or in any suitable form factor. In some embodiments, computing unit 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), Rambus® DRAM (RDRAM®), Flash memory, or any other suitable type of volatile or non-volatile memory, for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120*a-c* via a standard Small Computer System Interface (SCSI), a Fiber Channel interface, a Firewire® (IEEE 1394) interface, or another suitable interface. Additionally, it is contemplated that in other embodiments, any other suitable peripheral devices may be coupled to processors 120*a-c*, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120*a-c*, such as from a power-on reset state.

As described in greater detail below, each of processors 120*a-c* may include one or more processor cores and cache memories. In some embodiments, each of processors 120*a-c* may be coupled to a corresponding system memory, while in other embodiments, processors 120*a-c* may share a common system memory. Processors 120*a-c* may be configured to work concurrently on a single computing task and may communicate with each other through coherent interconnect 180 to coordinate processing on that task. For example, a computing task may be divided into three parts and each part may be assigned to one of processors 120*a-c*. Alternatively, processors 120*a-c* may be configured to concurrently perform independent tasks that require little or no coordination among processors 120*a-c*.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core.

Figure 2:
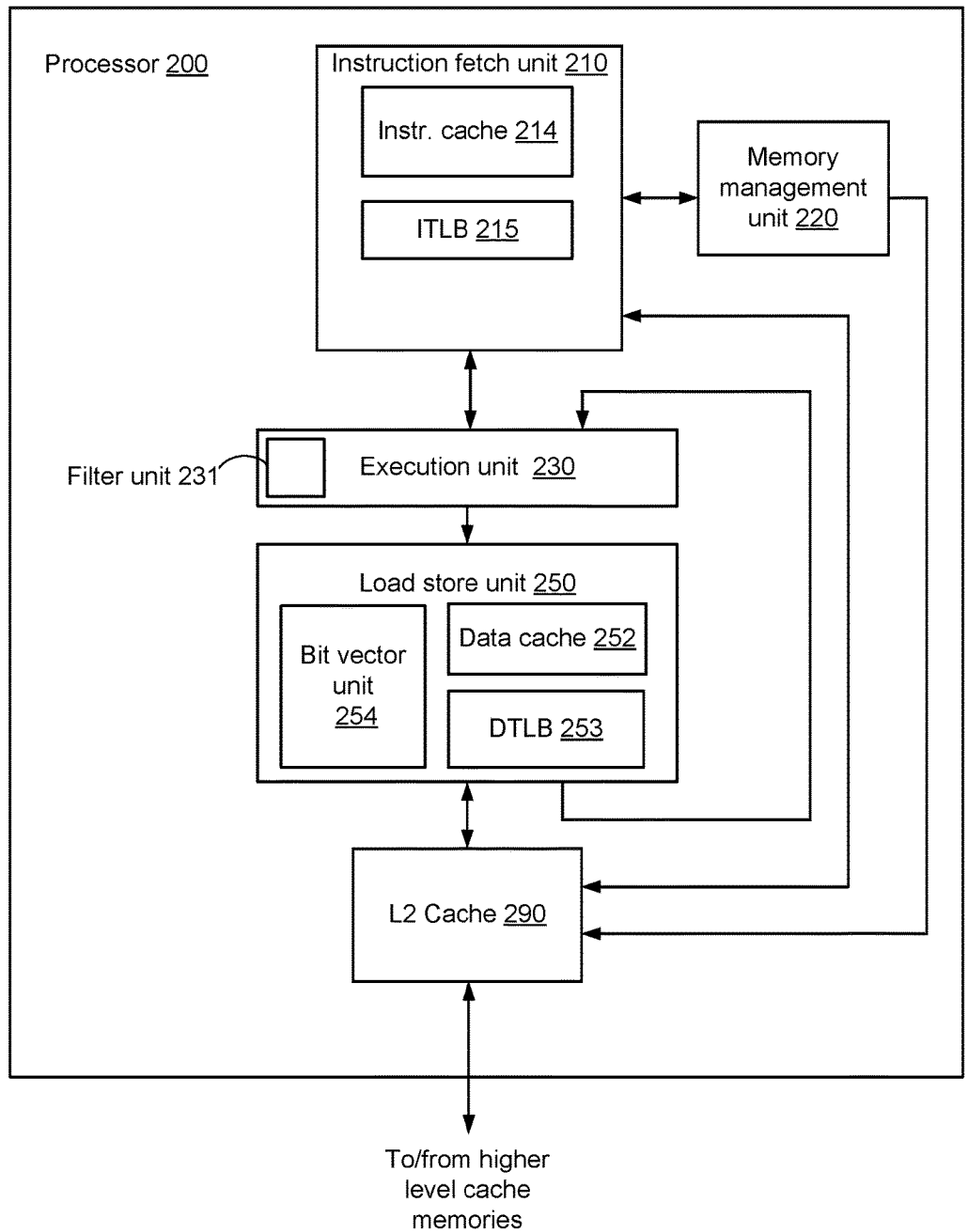
FIG. 2 illustrates an embodiment of a processor.

A possible embodiment of processor is illustrated in FIG. 2. In the illustrated embodiment, processor 200 includes an instruction fetch unit (IFU) 210 coupled to a memory management unit (MMU) 220, a L2 cache memory 290, and execution unit 230. Execution unit 230 is coupled to load store unit (LSU) 250, which is also coupled to send data back to each of execution unit 230. Additionally, LSU 250 is coupled to L2 cache memory 290, which may, in turn, be coupled to higher-level cache memories.

Instruction fetch unit 210 may be configured to provide instructions to the rest of processor 200 for execution. In the illustrated embodiment, IFU 210 may be configured to perform various operations relating to the fetching of instructions from cache or memory, such as, e.g., system memory 130, the selection of instructions from various threads for execution, and the decoding of such instructions prior to issuing the instructions to various functional units for execution. Instruction fetch unit 210 further includes an instruction cache 214. In one embodiment, IFU 210 may include logic to maintain fetch addresses (e.g., derived from program counters) corresponding to each thread being executed by processor 200, and to coordinate the retrieval of instructions from instruction cache 214 according to those fetch addresses.

In one embodiment, IFU 210 may be configured to maintain a pool of fetched, ready-for-issue instructions drawn from among each of the threads being executed by processor 200. For example, IFU 210 may implement a respective instruction buffer corresponding to each thread in which several recently-fetched instructions from the corresponding thread may be stored. In some embodiments, IFU 210 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 210 may be configured to further prepare instructions for execution, for example by decoding instructions, detecting scheduling hazards, arbitrating for access to contended resources, or the like. Moreover, in some embodiments, instructions from a given thread may be speculatively issued from IFU 210 for execution. Additionally, in some embodiments IFU 210 may include a portion of a map of virtual instruction addresses to physical addresses. The portion of the map may be stored in Instruction Translation Lookaside Buffer (ITLB) 215.

Execution unit 230 may be configured to execute and provide results for certain types of instructions issued from IFU 210. In one embodiment, execution unit 230 may be configured to execute certain integer-type instructions defined in the implemented instruction set architecture (ISA), such as arithmetic, logical, and shift instructions. It is contemplated that in some embodiments, processor 200 may include more than one execution unit 230, and each of the execution units may or may not be symmetric in functionality.

Additionally, execution unit 230 includes filter unit 231 which may be configured to perform filter operations on data stored in memory using multiple bit vectors. As described below in more detail, filter unit 231 may, in some embodiments, include a dual issue pipeline allowing for more than one filter operation to be performed in parallel. Although filter unit 231 is depicted as being included in execution unit 230 in the embodiment illustrated in FIG. 2, in other embodiments, filter unit 231 may be included in any suitable circuit block of processor 200. It is noted that although filter unit 231 is depicted as being included in processor 200, in other embodiments, filter unit 231 may be included in any suitable hardware engine, such as, a direct memory access (DMA) engine, for example.

Load store unit 250 may be configured to process data memory references, such as integer and floating-point load and store instructions. In some embodiments, LSU 250 may also be configured to assist in the processing of instruction cache 214 misses originating from IFU 210. LSU 250 may include a data cache 252 as well as logic configured to detect cache misses and to responsively request data from L2 cache 290 or a L3 cache partition via L3 cache partition interface 270. Additionally, in some embodiments LSU 350 may include logic configured to translate virtual data addresses generated by EXUs 230 to physical addresses, such as Data Translation Lookaside Buffer (DTLB) 253.

In the embodiment illustrated in FIG. 2, LSU 250 also includes bit vector unit 254. As described below in more detail, bit vector unit 254 may be configured to determine addresses of sparse data to be loaded into processor 200 using a bit vector. In various embodiments, the bit vector may indicate which elements of a data array stored in memory are to be loaded into processor 200. Additionally, the position of elements within the bit vector may be used to determine an address location in memory from which to retrieve a particular array element. Although bit vector unit 254 is depicted as being included in LSU 250 in the embodiment of FIG. 2, in other embodiments, bit vector unit 254 may be included any suitable circuit block of processor 200. It is further noted that although filter unit 231 is depicted as being included in processor 200, in other embodiments, filter unit 231 may be included in any suitable hardware engine, such as, a DMA engine, for example.

It is noted that the embodiment of a processor illustrated in FIG. 2 is merely an example. In other embodiments, different functional block or configurations of functional blocks are possible and contemplated.

Figure 3:
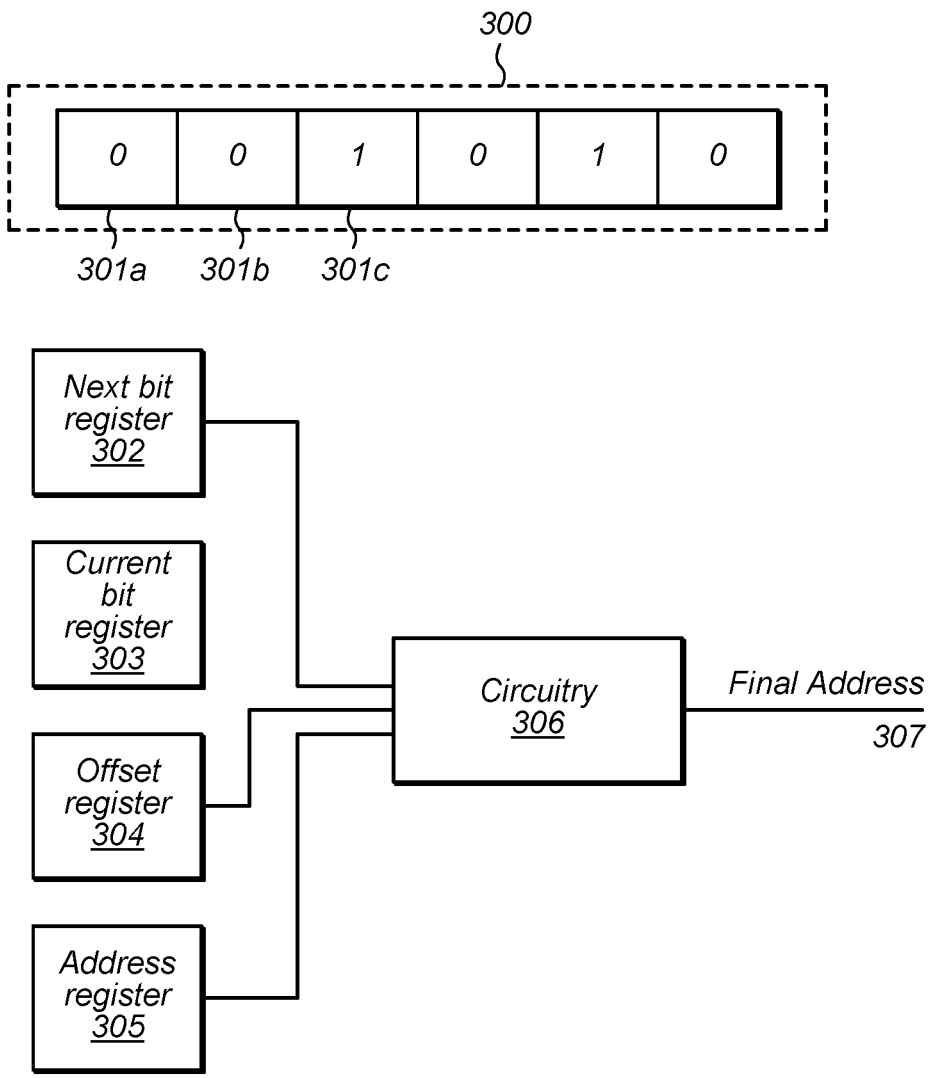
FIG. 3 illustrates an embodiment Bit Vector Unit.

Turning to FIG. 3, a block diagram. An embodiment of a bit vector unit is illustrated. The embodiment illustrated in FIG. 3 may, in some embodiments, correspond to bit vector unit 254 as depicted in the embodiment of FIG. 2. In the illustrated embodiment, the bit vector unit includes register 300, next bit register 302, current bit register 303, offset register 304, address register 305, and circuitry 306.

A register may be designed according to one of various design styles. For example, a register may include multiple data storage circuits coupled together and configured to operate in parallel. A register may include, in various embodiments, multiple flip-flop circuits, latch circuits, or any other suitable storage circuit.

Register 300 may include multiple storage circuits arranged in an ordered sequence, each of which may store a corresponding logic value. The data stored in register 300 may be used to determine address locations for data structures in memory, such as, vectors, and arrays, for example. In such cases, the data stored in register 300 may be referred to as a bit vector, and one logic value, such as, e.g., a logical-1, may correspond to a populated data element in a vector or array.

In the illustrated embodiment, the storage circuits of register 300 at element position 301*a* and 301*b* are shown storing logical-0s, while the storage circuit of register 300 at element position 301*c* is depicted as storing a logical-1. In various embodiments, the combination of values stored in register 300 may be written by the execution of one or more program instructions. In some cases, the logical-1 stored in the storage circuit at element position 301*c* may correspond to a populated data element in an array or vector. It is noted that, in other embodiments, a logical-0 stored in a particular element position may indicate a corresponding populated data elements, and a logical-1 value may indicate a corresponding un-populated data element.

As used and described herein, a "low" or "logical-0" refers to a voltage at or near ground and that "high" or "logical-1" refers to a voltage level sufficiently large to turn on a n-channel MOSFET and turn off a p-channel MOSFET. In other embodiments, different technology may result in different voltage levels for "low" and "high."

Next bit register 302 may store a value used as a pointer to a particular element position in register 300. As described below in more detail, the pointer value stored in next bit register 302 may be used during a search for certain values, such as, e.g., logical-1 values, stored within register 300. In some embodiments, next bit register 302 may be updated in response to the completion of multiple operations on a particular element position within register 300.

Current bit register 303 may store a value used as a pointer to a current element position in register 300, and offset register 304 may be used store an address offset value calculated by circuitry 306. Address register 305 may store a base address value that is used to generate an address in memory corresponding to a particular element position in register 300. In various embodiments, the value stored in address register 305 may be updated during execution of program instructions, thereby allowing for different memory structures, e.g., vectors and arrays, to be accessed using the different bit vector unit.

Circuitry 306 may include any suitable combination of logic circuits to perform shift and addition operations in order to generate final address 307. In some embodiments, circuitry 306 may perform a shift operation on the value stored in next bit register 302 to generate an offset value to be stored in offset register 304. Circuitry 306 may also be configured to add the value stored in offset register 304 and the value stored in address register 305 to generate final address 307. Although circuitry 306 is depicted in the illustrated embodiment as being included in the bit vector unit, in other embodiments, other circuitry within an execution unit, such as, e.g., execution unit 230 of the embodiment illustrated in FIG. 2, may be used in conjunction with, or in lieu of circuitry 306.

Figure 4:
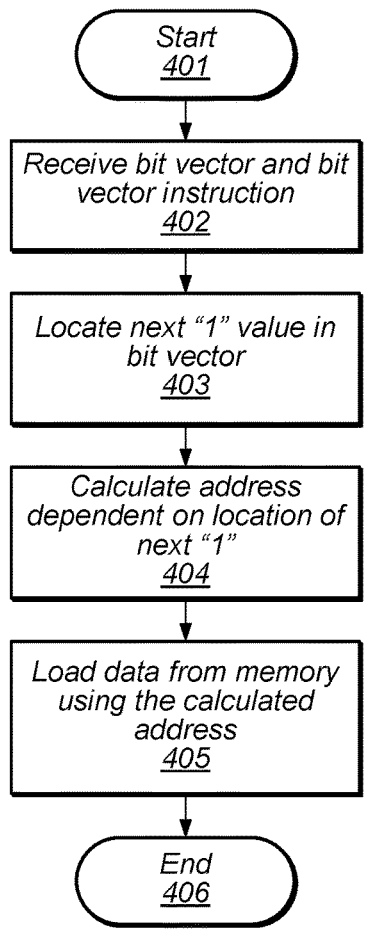
FIG. 4 depicts a flow diagram illustrating an embodiment of a method for loading data using a bit vector.

It is noted that the embodiment illustrated in FIG. 3 is merely an example. In other embodiments, different numbers of registers and different configurations of registers are possible and contemplated A flow diagram depicting an embodiment of a method for performing a load using a bit vector is illustrated in FIG. 4. The method begins in block 401. A bit vector unit, such as, e.g., bit vector unit 300 as illustrated in the embodiment of FIG. 3 may then receive a bit vector and a bit vector instruction (block 402). In various embodiments, values may be previously loaded into the bit vector by the execution of one or more program operations. The bit vector instruction may be included in an ISA for a computing system. For example, the ISA may include commands such as, blvd and filt for performing data loads and filter commands using a bit vector.

The bit vector unit may then locate a logical-1 value in the bit vector (block 403). In various embodiments, the bit vector unit may start at an initial element position with the bit vector and sequentially move through the remaining element positions until a logical-1 value is detected.

Once a logical-1 value has been detected, an address may then be calculated dependent on the element position of the detected logical-1 value (block 404). In some cases, the element position may be multiplied by an address offset value. The resultant product may then be added to a base address, which may correspond to a starting address of an array or other spare data structure stored in memory.

A LSU, such as, e.g., LSU 250 as illustrated in FIG. 2, may then retrieve a particular array element or other portion of data from the calculated address (block 405). The LSU may check if the data at the calculated address is available in a cache memory. If the desired data is not available in the cache memory, a request for the desired data may be sent to a higher-level cache memory or main memory. Once the desired data has been loaded, the method may conclude in block 406.

It is noted that the method illustrated in the flow diagram of FIG. 4 is merely an example. In other embodiment, different operations and different orders of operations may be employed.

Figure 5:
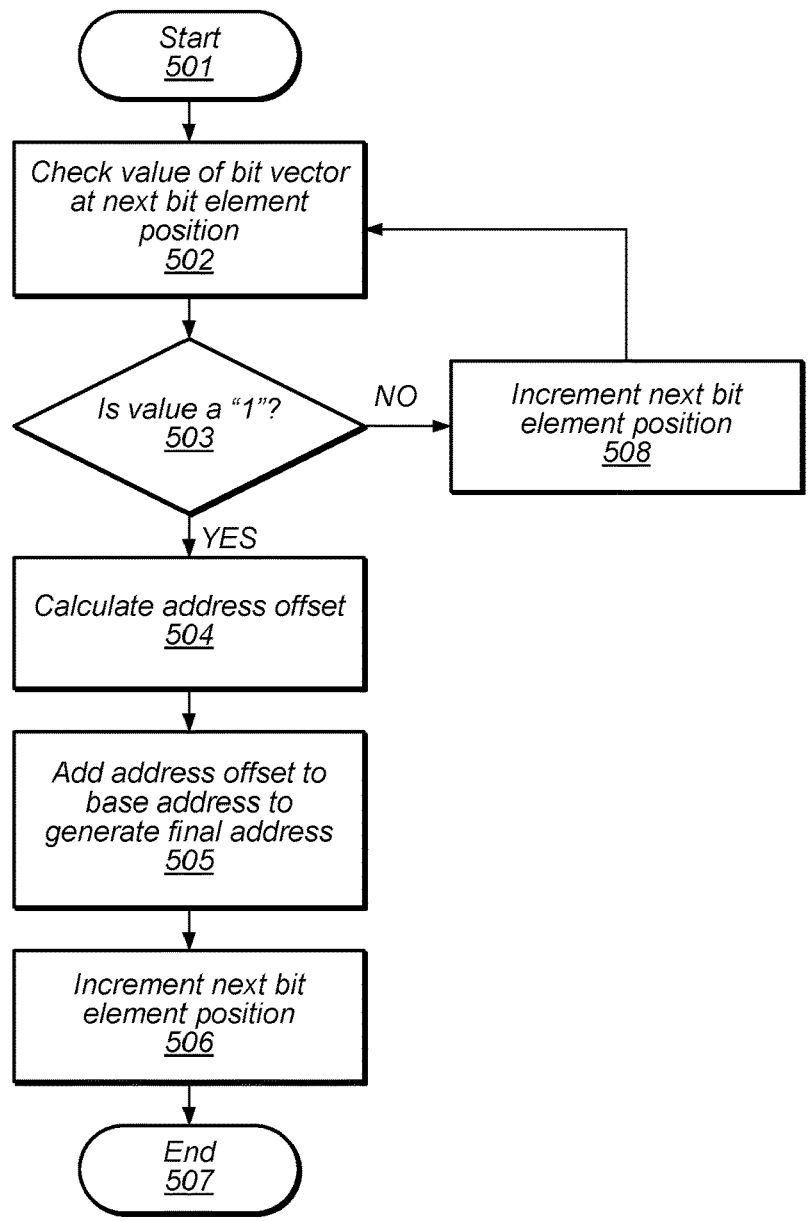
FIG. 5 depicts flow diagram illustrating an embodiment of a method for calculating an address for data retrieval using a bit vector.

A flow diagram depicting an embodiment of a method for calculating an address using a bit vector is illustrated in FIG. 5. In some embodiments, the method depicted in the flow diagram of FIG. 5 may correspond to operations 403 and 404 as illustrated in the flow diagram of FIG. 4. The method begins in block 501. A value of the next bit element position may then be checked (block 502). In various embodiments, the next bit element position may be stored in a register such as, next bit register 302, for example. The method may then depend on the value of the bit vector at the next bit element position (block 503).

If the value of the bit vector at the next bit element position is not a logical-1, then the value of the next bit element position may be incremented (block 508). In some cases, the updated next bit element position may be stored in a register, such as, next bit register 302, for example. Once the next bit element position value has been updated, the method may proceed from block 502 as described above.

If, however the value of the bit vector at the next bit element position is a logical-1, then an address offset may be calculated (block 504). The address offset may be calculated, in various embodiments, by left shifting the next bit element position by the number of elements included in the bit vector. Additionally, the value of the next bit element position may be stored in a current bit register, such as, current bit register 303 as illustrated in FIG. 3, for example. The address offset may also be stored in an offset register, such as, offset register 304, for example.

The address offset may then be added to a base address to generate a final address (block 505). The base address may be stored in a register, such as, e.g., address register 305, and may be programmable by the execution of one or more program instructions. In some embodiments, circuitry, such as, circuitry 306, included in a bit vector unit, may include an adder, or other suitable circuits, for adding the address offset to the base address.

The value for the next bit element position may then be incremented (block 506). The incremented value may then be stored in a register, such as, e.g., next bit register 302 as illustrate in FIG. 3. Once the next bit element position has been stored in the register, the method may conclude in block 507.

It is noted that the embodiment illustrated in FIG. 5 is merely an example. In other embodiments, different operations and different orders of operations are possible and contemplated.

Figure 6:
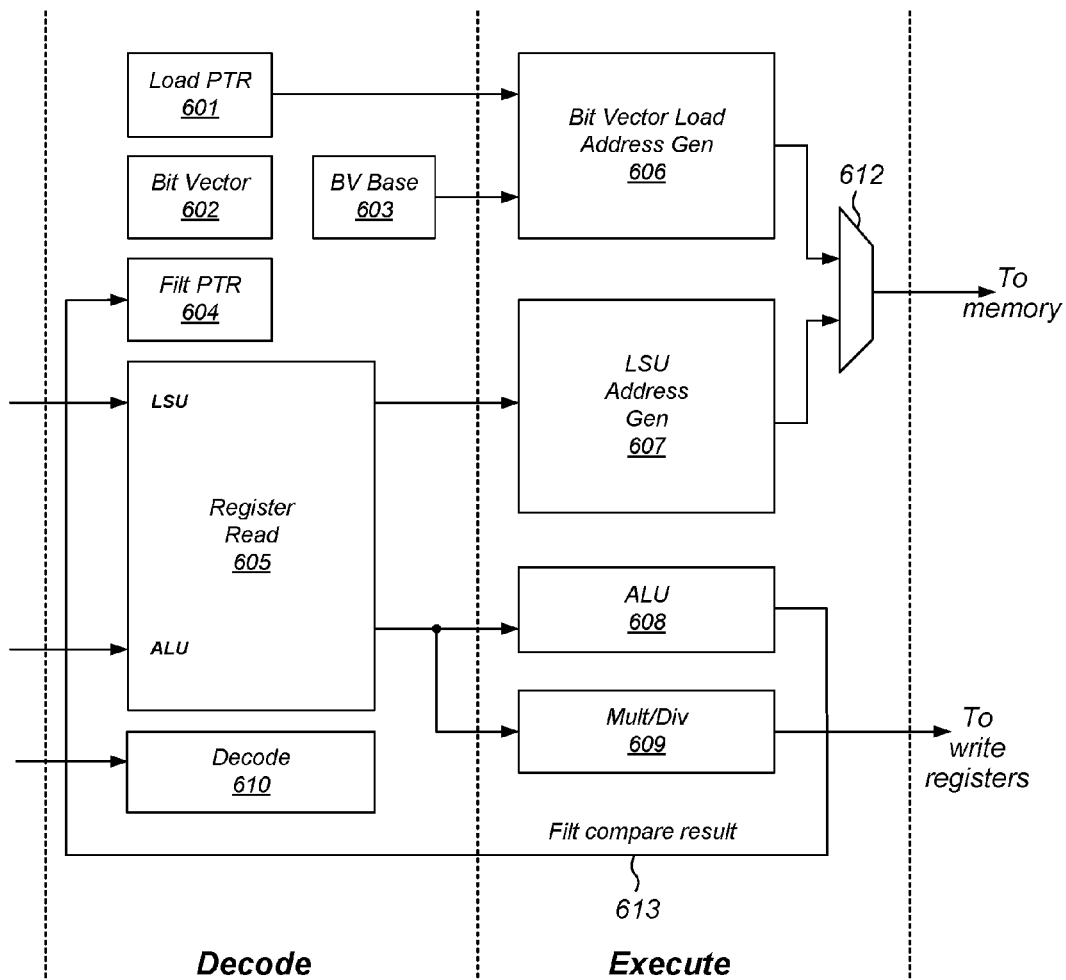
FIG. 6. Illustrates a block diagram of an embodiment of a portion of a processing pipeline included in a processor or processor core.

An embodiment of part of a processing pipeline of a processor or processor core is illustrated in FIG. 6. In the illustrated embodiments, the pipeline is split into two stages, the decode stage and the execute stage. Load PRT 601, bit vector 602, bit vector (BV) base 503, filt pointer 604, register read 605, and decode 610 are included in the decode stage. Bit vector load and address generator 606, LSU address generator 607, ALU 608, Mult/Div 609, and multiplex circuit 612 are included in the execute stage. It is noted that in the illustrated embodiment, the arrangement of the aforementioned circuit blocks is merely an example, and that, in other embodiments, any suitable arrangement of the circuit blocks may be employed.

In the illustrated embodiment, two instructions may be moved from the decode stage to the execution stage in a given processor cycle. A pipeline that is capable of moving two instructions between stages in a single processor cycle is commonly referred to as a dual-issue pipeline. Although the embodiment depicted in FIG. 6, illustrates a dual-issue pipeline, in other embodiments, the pipeline may be single-issue.

During operation, the execution of program instructions may load data into bit vector 602, which may, in some embodiments, correspond to register 300 as illustrated in FIG. 3. A value stored in BV base 603 may also be loaded by the execution of program instructions. In some embodiments, BV base 603 may correspond to address register 305 as depicted in the embodiment illustrated in FIG. 3.

When a bvld instruction is detected by decode 610, the contents of bit vector 602 and BV base 603 are used by bit vector load address generator 606 to generate the desired addresses in memory. Multiplex circuit 612 then selects the output of bit vector load address generator 606 to send to memory for retrieval of the desired data, instead of an output from LSU address generator 607, which is used for other load operations. The retrieved data is stored in register read 605 for further processing using a filt or other suitable instruction. During the bit vector load operation, load PTR 601 may be updated as the various element positions within bit vector 602 are examined.

As described below in more detail, during of filter operations, ALU 608 may be used to execute comparison operations between data retrieved using the values stored in bit vector 602 and BV base 603, and previously determined data. Filt PTR 604 may include a register configured to store results from of ALU 608. Each of the element positions included in the bit vector stored in filt PTR 604 may be updated based on the result of a comparison between a particular data element of a vector or array loaded into register read 605 by a bit vector load, and a predetermined value. By using a bit vector load and storing results of the comparison in bit vector format, only populated data elements in a particular vector or array need to be processed, reducing a number of instructions that need to be executed, which may, in some embodiments, reduce power consumption.

It is noted that the embodiment illustrated in FIG. 6 is merely an example. In other embodiments, different circuit blocks and different arrangements of circuit blocks may be employed.

In addition to reducing the overhead for loading and operating on a sparse data array, bit vectors may also be used to implement filtering operations. As described below in more detail, by employing two bit vectors, a filter unit may be able to run comparison operations on populated data elements in a sparse data array while ignoring the unpopulated data elements. A pseudo code example of filtering a vector of data using the bit vector and filter units is depicted in Program Code Example 1.

Program Code Example 1:

```
// b = compare value
bvld reg1, bvid
// loop_start LOOP_COUNT
filt reg1, b
blvd reg2, bvid
filt reg2, b
bvld reg1, bvid
// loop_end
filt reg1, b
```

By employing the bvld and filt operations, one data element included in the vector or array may be processed. In cases where the bit vector unit and the filter unit were not used, i.e., the bvld and filt commands are omitted, additional program instructions may be executed, thereby increasing power consumption.

Figure 7:
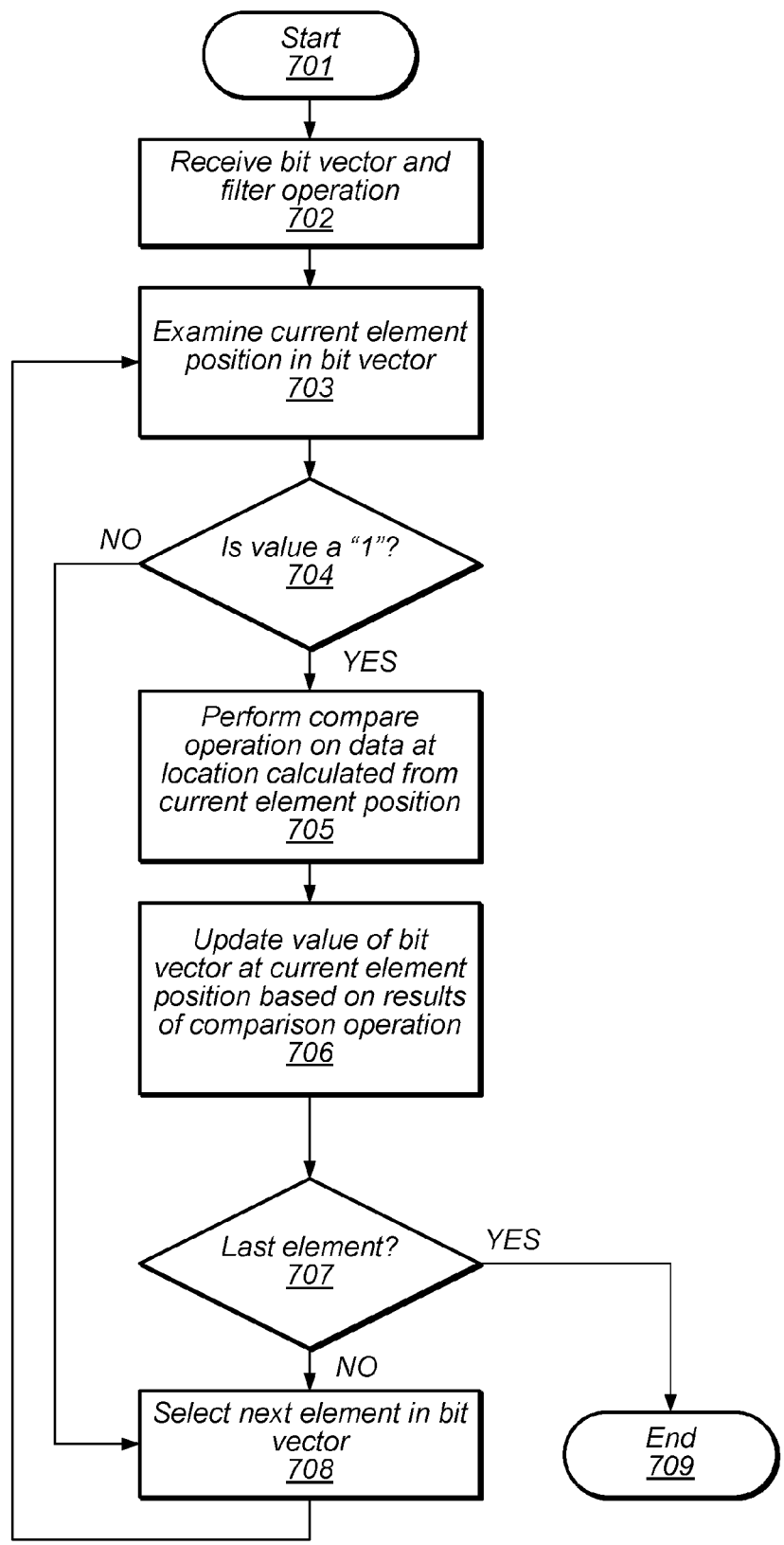
FIG. 7 depicts a flow diagram illustrating an embodiment of a method for performing filter operations using a bit vector.

Turning to FIG. 7, a flow diagram depicting an embodiment of method for performing a filter operation on a vector or array of data is illustrated. The method begins in block 701. A bit vector and a filter operation, such as, e.g., filt, may then be received (702). In various embodiments, the bit vector and filter instruction may be received by a processing pipeline as illustrated in the embodiment of FIG. 6. It is noted that in a multi-threaded processor or processor core, multiple bit vectors and associated commands may be processed in parallel.

The value of the first bit vector at the position specified by the current element position pointer may then be examined (block 703). The method may then depend on the value being examined (block 704). If the value of the bit vector at the position specified by the current element position pointer is not a logical-1, the current element pointer is incremented (block 708). Once the current element pointer has been updated, the method may proceed as described above from block 703.

If, however, the value of the bit vector at the position specified by the current element position pointer is a logical-1, then a comparison operation may be performed on data corresponding to the current element position pointer for the bit vector (block 705). In various embodiments, the data may be loaded into a data cache, or any other suitable memory, from main memory using an address calculated dependent upon the current element position. The loaded data may then be compared to a predetermined value. The comparison may, in various embodiments, include determining which of the loaded data or predetermined value is largest. Alternatively, the comparison may include determining which of the two elements is the smallest. It is noted that although finding minimum and maximum values are disclosed, in other embodiments, any other suitable comparison may be employed.

Once the comparison has been made, a value of the bit vector may then be updated (block 706). In various embodiments, the value of the bit vector may be located at an element position corresponding to the current element position of the first bit vector. The value of the bit vector may be set to a particular value depending on the results of the comparison. For example, if the comparison indicates that the loaded data is greater than the predetermined value, the value of the bit vector may be set to a logical-1. Alternatively, if the comparison indicates that the loaded data is less than the predetermined value, the value of the bit vector may be set to a logical-0. The method then depends if the current element position of the bit vector is the last element position (block 707).

If the current element position is the last element position, then the method may conclude in block 709. If, however, the current element position is not the last element position, then the method may proceed from block 708 as described above.

It is noted that the embodiment of the method depicted in the flow diagram of FIG. 7 is merely an example. In other embodiments, different operations and different arrangements of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a register configured to store a bit vector, wherein the bit vector includes a plurality of elements that occupy N ordered element positions, wherein N is a positive integer; and
   circuitry configured to:
      identify a particular element position of the bit vector, wherein a value of a element occupying the particular element position matches a first value;
      determine an address value using the particular element position of the bit vector and a base address; and
      store a data value in the particular element position of the bit vector based on results of a comparison between a second value and data loaded from a location in a memory specified by the address value.

2. The apparatus of claim 1, wherein to store the data value, the circuitry is further configured to determine which of the data or the second value is greater.

3. The apparatus of claim 1, wherein to determine the address value, the circuitry is further configured to determine an address offset based on the particular element position.

4. The apparatus of claim 3, wherein to determine the address offset, the circuitry is further configured to perform a shift operation on a pointer value corresponding to the particular element position.

5. A method, comprising:
   receiving a bit vector;
   wherein the bit vector includes a plurality of elements that occupy N ordered element positions, wherein N is a positive integer;
   identifying a particular element position of the bit vector, wherein a value of a element occupying the particular element position matches a first value;
   determining an address value dependent upon the particular element position of the bit vector and a base address; and
   storing a data value in the particular element position of the bit vector based on results of comparing a second value and data loaded from a location in a memory specified by the address value.

6. The method of claim 5, wherein storing the data value includes determining which of the data or the second value is greater.

7. The method of claim 5, wherein determining the address value includes determining an address offset based on the particular element position.

8. The method of claim 7, wherein determining the address offset includes performing a shift operation on a pointer value corresponding to the particular element position.

9. The method of claim 7, further comprising adding the address offset to the base address to generate the address value.

10. The method of claim 5, further comprising incrementing a pointer value corresponding to the particular element position in response to determining the address value.

11. A system, comprising:
   a memory; and
   a processor configured to:
      fetch an instruction from the memory;
      identify a particular element position of a bit vector in response to a determination that the instruction is a bit vector instruction, wherein the bit vector includes a plurality of elements that occupy N ordered element positions, wherein N is a positive integer, and wherein a value of an element occupying the particular element position matches a first predetermined value;
      determine an address value dependent upon the particular element position of the bit vector and a base address; and
      store a data value in the particular element position of the bit vector based on results of a comparison between a second value and data loaded from a location in the memory specified by the address value.

12. The system of claim 11, wherein to store the data value, the processor is further configured to determine which of the data or the second value is greater.

13. The system of claim 11, wherein to determine the address value, the processor is further configured to determine an address offset based on the particular element position.

14. The system of claim 13, wherein to determine the address offset, the processor is further configured to perform a shift operation on a pointer value corresponding to the particular element position.

* * * * *

UNITED STATES PATENT AND TRADEMARK OFFICE
CERTIFICATE OF CORRECTION

PATENT NO. : 10,216,515 B2
APPLICATION NO. : 15/296886
DATED : February 26, 2019
INVENTOR(S) : Schlanger et al.

Page 1 of 1

It is certified that error appears in the above-identified patent and that said Letters Patent is hereby corrected as shown below:

In the Specification

In Column 6, Line 45, after "contemplated" insert -- . --.

Signed and Sealed this
Twenty-first Day of January, 2020

Andrei Iancu
*Director of the United States Patent and Trademark Office*